ically valued perfume bases and are used in large quantities throughout the perfume industry. The oil, however, is expensive and is in limited and sometimes sporadic supply. For this reason, a continuous effort has been made to synthesize various components of the oil or similar synthetic materials which possess the desirable woody fragrance of sandalwood oil.

United States Patent Office 3,644,505
Patented Feb. 22, 1972

3,644,505
PERFUME COMPOSITION INCLUDING TETRA-HYDROPYRANYL ETHER OF 3-ENDO-METHYL-3 - EXO(4' - METHYL - 5 - HYDROXYPENTYL) NORCAMPHOR
Wayne I. Fanta, Colerain Township, Hamilton County, and William F. Erman, Springfield Township, Hamilton County, Ohio, assignors to The Procter & Gamble Company, Cincinnati, Ohio
No Drawing. Original application Mar. 29, 1968, Ser. No. 717,384. Divided and this application Apr. 6, 1970, Ser. No. 26,132
Int. Cl. C11b 9/00; C11d 1/00
U.S. Cl. 252—522                    1 Claim

ABSTRACT OF THE DISCLOSURE

The novel odorant compounds, 2-methyl-5-bromopentyl tetrahydropranyl ether and tetrahydropyranyl ether of 3 - endo - methyl-3-exo-(4'-methyl-5'-hydroxypentyl)norcamphor and a process for preparing 2-methyl-5-bromopentyl tetrahydropyranyl ether, tetrahydropyranyl ether of 3-endo-methyl-3-exo(4'-methyl-5'-hydroxypentyl) norcamphor and 3 - endo-methyl-3-oxo(4'-methyl-5'-hydroxypentyl)norcamphor comprising the steps of: (1) esterifying 2-methyl-4-pentenol; (2) hydrobrominating the ester in the presence of a free radical catalyst; (3) reducing the hydrobrominated ester to 2-methyl-5-bromopentanol; (4) etherifying 2-methyl-5-bromopentanol with dihydropyran to obtain the novel compound, 2-methyl-5-bromopentyl tetrahydropyranyl ether; (5) alkylating 3-methylnorcamphor with the 2 - methyl - 5-bromopentyl tetrahydropyranyl ether to obtain the novel compound, tetrahydropyranyl ether of 3 - endo - methyl - 3-oxo(4'-methyl - 5'-hydroxypentyl)norcamphor; and (6) treating tetrahydropyranyl ether of 3 - endo - methyl - 3-oxo(4'-methyl - 5' - hydroxypentyl)norcamphor with p-toluenesulfonic acid or hydrochloric acid to obtain 3-endo-methyl-3-exo(4'-methyl-5'-hydroxypentyl)norcamphor.

CROSS-REFERENCE TO RELATED APPLICATIONS

This application is a division of applicants' copending application, Ser. No. 717,384, filed Mar. 29, 1968, now abandoned.

FIELD OF THE INVENTION

This invention relates to perfume compositions containing two novel compounds, viz. 2-methyl-5-bromopentyl tetrahydropyranyl ether and tetrahydropyranyl ether of 3 - endo - methyl - 3-exo(4'-methyl-5'-hydroxypentyl)norcamphor.

These compounds are prepared by a process using 2-methyl-4-pentenol as the starting material. The 2-methyl-4-pentenol, protected as an ester, is hydrobrominated through a free radical, anti-Markownikoff, addition; the ester is reduced and, subsequently, etherified with dihydropyran to form the novel compound, 2-methyl-5-bromopentyl tetrahydropyranyl ether. 2-methyl-5-bromopentyl tetrahydropyranyl ether is used in alkylating 3-methylnorcamphor to obtain the second novel compound, tetrahydropyranyl ether of 3 - endo - methyl - 3-exo(4'-methyl-5'-hydroxypentyl)norcamphor. Both of the novel compounds have highly desirable and useful odors and can be used individually or in admixture with each other as odorants per se or they can be used as components of perfume compositions.

HISTORY OF THE INVENTION

East Indian sandalwood oil has heretofore been available only from East Indian sandalwood trees. This oil and various individual components of the oil are highly valued perfume bases and are used in large quantities throughout the perfume industry. The oil, however, is expensive and is in limited and sometimes sporadic supply. For this reason, a continuous effort has been made to synthesize various components of the oil or similar synthetic materials which possess the desirable woody fragrance of sandalwood oil.

The novel compounds, 2-methyl-5-bromopentyl tetrahydropyranyl ether and tetrahydropyranyl ether of 3-endo - methyl - 3 - exo(4'-methyl-5'-hydroxypentyl)norcamphor, and the process for preparing these compounds and 3 - endo - methyl-3-exo(4'-methyl-5'-hydroxypentyl) norcamphor represent a portion of an extensive scientific effort to obtain dihydro-β-santalol, a novel compound having a desirable sandalwood fragrance. Other processes and intermediate compounds relating to the synthesis of dihydro-β-santalol and the compound, dihydro-β-santalol, are described in the following U.S. patent applications which were filed simultaneously with the parent application herein: Fanta and Erman, 3-Endo-Methyl-3-Exo(4'-Methyl - 5' - Hydroxypentyl)Norcamphor and 2-Methyl-5-Bromopentanol, and Process for the Preparation of These Compounds, Ser. No. 717,360; filed Mar. 29, 1968; Fanta and Erman, Preparation of 3-Endo-Methyl-3-Exo-(4' - Methyl - 5' - Hydroxypentyl)Norcamphor From 2-Methyl-4-Pentenol, Ser. No. 747,374; filed Mar. 29, 1968; Fanta and Erman, Preparation of 3-Endo-Methyl-3-Exo-(4' - Methyl - 5' - Hydroxypentyl)Norcamphor from 2-Methyl-4-Pentenol, Ser. No. 717,362; filed Mar. 29, 1968; Fanta and Erman, Dihydro-β-Santalol and Process for Preparing Dihydro - β - Santalol From 3-Endo-Methyl-3-Exo(4'-Methyl-5'-Hydroxypentyl)Norcamphor, Ser. No. 717,458; filed Mar. 29, 1968.

SUMMARY OF THE INVENTION

The present invention relates to perfume compositions containing the compounds, 2-methyl-5-bromopentyl tetrahydropyranyl ether and tetrahydropyranyl ether of 3-endo - methyl - 3 - exo(4'-methyl-5'-hydroxypentyl)norcamphor.

The process for preparing the compounds comprises the steps of:
(1) Esterifying 2-methyl-4-pentenol having the general formula

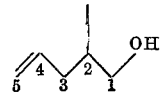

to obtain the ester of 2-methyl-4-pentenol having the general formula

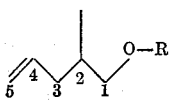

wherein R is an acyl group containing from 2 to about 5 carbon atoms;
(2) Hydrobrominating the ester of Step 1 with hydrogen bromide in the presence of a free radical catalyst to obtain a 2-methyl-5-bromopentyl ester having the general formula

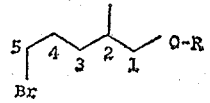

(3) Reducing the hydrobrominated ester of Step 2 with a reducing agent to obtain 2-methyl-5-bromophentanol having the general formula

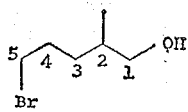

(4) Etherifying 2-methyl-5-bromopentanol with dihydropyran to obtain the 2-methyl-5-bromopentyl tetrahydropyranyl ether having the general formula

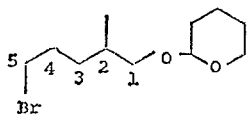

(5) Reacting 2-methyl-5-bromopentyl tetrahydropyranyl ether with a mixture prepared from 3-methylnorcamphor having the general formula

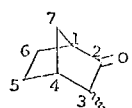

and a strong base to obtain the novel compound, tetrahydropropyranyl ether of 3-endo-methyl-3-exo(4'-methyl-5'-hydroxypentyl)norcamphor having the general formula

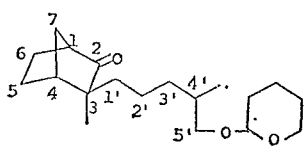

and (6) Treating tetrahydropyranyl ether of 3-endo-methyl-3-exo(4'-methyl-5' - hydroxypentyl)norcamphor with a catalytic amount of an acid selected from the group consisting of p-toluenesulfonic acid and hydrochloric acid to obtain 3 - endo-methyl-3-exo(4'-methyl-5'-hydroxypentyl) norcamphor having the general formula

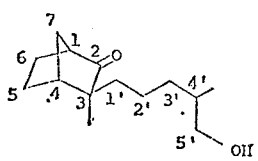

DESCRIPTION OF THE PRODUCTS AND PROCESS

The initial starting product, 2-methyl-4-pentenol, is known and can be obtained by several different methods. One method comprises reacting diethyl malonate with methyl bromide in the presence of a base to obtain diethyl methylmalonate. Diethyl methylmalonate is reacted with allyl chloride in a base catalyzed alkylation reaction to obtain diethyl methylallylmalonate. This compound is saponified with a base to obtain the salt, and then the salt is reacted with an acid to obtain the dicarboxylic acid. Heat is applied to the dicarboxylic acid at reduced pressures to obtain the monocarboxylic acid which is subsequently reduced to 2-methyl-4-pentenol with lithium aluminum hydride. This synthesis is generally described in Allen et al., "2-Methylenedodecanoic Acid," Organic Syntheses, 38, pp. 47–51 (1958) and Fray et al., "Constituents of the Lipids of Tubercule Bacilli, Part VII. Synthesis of (+)-2(L):4-Dimethyldocosanoic Acid, an Oxidation Product of Mycolipenic Acid," Journal of the Chemical Society, pp. 2036–41 (1956).

A second method of obtaining 2-methyl-4-pentenol is set forth in Cherest et al., "Addition of Grignard Reagents to the Double Bond of Allylic Alcohols," Tetrahedron Letters, No. 8, pp. 875–879 (1966). This reference discloses reacting 2.5 moles of allyl magnesium bromide with 1 mole of allyl alcohol to obtain 2-methyl-4-pentenol.

Another novel and less expensive way of obtaining 2-methyl-4-pentenol is described in the copending U.S. patent application of Fanta and Erman, 3-Endo-Methyl-3-Exo(4'-Methyl-5'-Hydroxypentyl)Norcamphor and 2-Methyl-5-Bromopentanol, and Process for the Preparation of These Compounds, Ser. No. 717,360; filed Mar. 29, 1968 at pages 6 and 7. (This disclosure is incorporated herein by reference.)

The first step of this process comprises esterifying 2-methyl-4-pentenol having the general formula

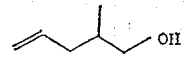

to obtain the ester of 2-methyl-4-pentenol having the general formula

wherein R is an acyl group containing from 2 to about 5 carbon atoms. General methods of esterifying alcohols are well known and are described in Cram and Hammond, "Organic Chemistry" (McGraw-Hill, 2nd ed., 1964), at pages 92–94 and 358–360 (these pages are incorporated herein by reference). These methods include reacting alcohols with acids, acid halides and acid anhydride. (The acyl chains should contain from 2 to about 5 carbon atoms.) A preferred method of forming an ester of 2-methyl-4-pentenol comprises dissolving 2-methyl-4-pentenol in a solvent and adding acetic anhydride thereto. The acetic anhydride is utilized in this step in a molar ratio of 2-methyl-4-pentenol to acetic anhydride of from about 1:1 to about 1:5 with about 1:3 being preferred. Examples of suitable solvents for use in this step include pyridine, collidine, trimethylamine, and triethylamine. Pyridine is the preferred solvent.

The esterification reaction is facile in the atmosphere at ordinary room temperatures in from about 12 to about 36 hours. The time required for the reaction to reach completion, however, is dependent on a number of factors, e.g., concentration of reactants, temperature of the reaction mixture and amount of solvent utilized. The temperature at which the esterification reaction is run is not critical providing extremely high or extremely low temperatures are not utilized, e.g., 0° C. to 50° C. In order to prevent the formation of by-products, the reaction is, preferably, run in an oxygen-free inert atmosphere, e.g., nitrogen or argon.

2-methyl-4-pentenyl acetate can be recovered from the above described reaction mixture in relatively pure form by adding water or an aqueous solution of a salt, e.g., sodium chloride, to the reaction mixture. The 2-methyl-4-pentenyl acetate is then extracted with ether. Any solvent, e.g., pyridine, remaining with the 2-methyl-4-pentenyl acetate can be removed by washing the product with a dilute acid solution. The excess acid is removed from the 2-methyl-4-pentenyl acetate by washing with water or an aqueous solution of a salt, e.g., sodium bicarbonate or sodium chloride. The ether solution of 2-methyl-4-pentenyl acetate is then dried by conventional means, for example, with magnesium sulfate. Removal of the solvent by distillation, preferably at reduced pressure, affords 2-methyl-4-pentenyl acetate which can be further purified by distillation at reduced pressure.

The second step of this process comprises hydrobrominating the ester of 2-methyl-4-pentenol with hydrogen bromide, preferably in gaseous form, in the presence of a catalytic amount of a free radical catalyst to obtain a 2-methyl-5-bromopentyl ester having the general formula

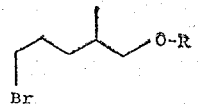

Although a solvent is not required in the hydrobromination of the 2-methyl-4-pentenyl ester, an aprotic solvent, i.e., a solvent which contains no readily available acidic protons, is generally and preferably utilized in this step. Among the aprotic solvents suitable for use herein are hexane, pentane, cyclohexane, methylene chloride, diethyl ether, carbon tetrachloride, benzene, toluene, and xylene. The aprotic solvent generally comprises from about 20% to about 99% by weight of the reaction mixture of Step 2.

Free radical catalysts suitable for use herein are well known and are discussed in Sosnovsky, "Free Radical Reactions in Preparative Organic Chemistry," pp. 6–11, Macmillan, New York (1964). These catalysts include peroxides, ozonides, thermally labile azo compounds, haloketone, and ketones and tetraethyl lead in the presence of ultraviolet light.

Hydrogen bromide is bubbled through a reaction mixture comprising the 2-methyl-4-pentenyl ester of Step 1, an aprotic solvent, and a free radical catalyst to obtain an ester of 2-methyl-5-bromopentanol. Although only one mole of hydrogen bromide is theoretically required to react with one mole of the 2-methyl-4-pentenyl ester, the hydrogen bromide is generally introduced in large excess, e.g., 1 to 30 moles of hydrogen bromide per mole of 2-methyl-4-pentenyl ester. The excess hydrogen bromide can be recycled through the reaction mixture. It is preferred that the hydrobromination reaction be run at low temperatures, i.e., from about −30° C. to about 45° C., preferably from about −10° C. to about 20° C. The low temperatures facilitate free radical, anti-Markownikoff, addition, i.e., formation of primary bromides and impede ionic addition, i.e., formation of secondary bromides. The reaction mixture is washed with a dilute base solution (sodium carbonate, sodium bicarbonate, or sodium hydroxide) and then with brine until neutral to remove the free radical catalyst and any hydrogen bromide in the reaction mixture to prevent formation of secondary reaction products. The reaction mixture is then dried and the aprotic solvent can be removed, e.g., by distillation, from the mixture leaving the ester of 2-methyl-5-bromopentanol as a residual oil.

The third step of this process comprises reducing the ester of 2-methyl-5-bromopentanol with a reducing agent to obtain 2-methyl-5-bromopentanol having the general formula

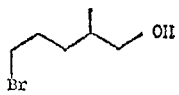

This reduction step can be accomplished with a number of solvents and a wide variety of reducing agents. Generally the reducing agents used herein are dissolved in a suitable solvent, e.g., diethyl ether, tetrahydrofuran, 1,2-dimethoxyethane or bis(2-methoxyethyl)ether. The preferred solvent for use herein is diethyl ether. The solvent is utilized in amounts sufficient to dissolve the ester of 2-methyl-5-bromopentanol and to provide a reaction medium. The solvent generally comprises from about 75% to about 98% of the reaction mixture of Step 3.

Examples of suitable and preferred reducing agents include lithium aluminum hydride, lithium borohydride and diborane. A highly preferred reducing agent for use herein is lithium aluminum hydride which is preferably modified by the addition of aluminum chloride to minimize reduction of the primary bromide.

In this preferred embodiment, the reducing properties of lithium aluminum hydride are modified by the addition of aluminum chloride in a molar ratio of lithium aluminum hydride to aluminum chloride of from about 0.9:1 to about 1:0.9, preferably in a molar ratio of 1:1. In preparing this modified reducing agent, a solvent, preferably diethyl ether, is added slowly and cautiously to the aluminum chloride to prevent evolution of great amounts of heat. This solution is cooled, generally to about room temperature, and added to lithium aluminum hydride suspended in a solvent, preferably diethyl ether. Preparation of this modified lithium aluminum hydride should be accomplished in an anhydrous atmosphere.

The reducing agents described above are used in a molar ratio of reducing agent to 2-methyl-5-bromopentanol of from about 0.5:1 to about 2:1, preferably about 1:1.

In this third step of this process, a reaction mixture comprising the ester of 2-methyl-5-bromopentanol, a reducing agent and a solvent in the above described proportions is prepared. The reducing agent, suspended in the solvent, is placed in a reaction flask. The 2-methyl-5-bromopentyl ester, dissolved in solvent, is added to the reducing agent solution and an exothermic reaction immediately begins. The ester, dissolved in solvent, can advantageously be added at such a rate as to maintain a gentle reflux (usually about 10 minutes to about 20 minutes). The reaction mixture is stirred for from about 30 minutes to about 2 hours at room temperature. The reaction product is then hydrolyzed to obtain 2-methyl-5-bromopentanol by cautiously adding water to the reaction mixture. An aqueous solution of a strong acid, e.g., sulfuric acid, is added to dissolve some of the lithium and aluminum salts. The mixture is extracted, for example, with ether and washed with water or an aqueous solution of a salt, for example, sodium bicarbonate or sodium chloride. The remaining ether solution of the 2-methyl-5-bromopentanol is then dried, e.g., with magnesium sulfate, and the solvent removed, preferably at reduced pressure, to obtain 2-methyl-5-bromopentanol.

The fourth step of this process comprises etherifying 2-methyl-5-bromopentanol with dihydropyran to obtain the novel compound, 2-methyl-5-bromopentyl tetrahydropyranyl ether having the general formula

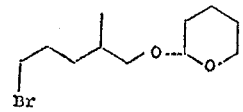

The 2-methyl-5-bromopentanol and dihydropyran are utilized in a molar ratio of dihydropyran to 2-methyl-5-bromopentanol of about 1:1 to about 1.5:1, preferably about 1.2:1. A slight molar excess of dihydropyran is generally used herein to increase the rate of reaction and to obtain complete conversion of the 2-methyl-5-bromopentanol to 2-methyl-5-bromopentyl tetrahydropyranyl ether. It is advantageous to add a catalyst such as phosphorous oxychloride, hydrochloric acid or p-toluenesulfonic acid, preferably phosphorous oxychloride, in a catalytic amount to further increase the rate of this reaction.

The reaction is allowed to go to completion which generally requires from about two to about six hours. The reaction mixture is then treated with a dilute solution of a base to remove any traces of the catalyst. The product is extracted, e.g., with ether, and the ether solution is washed in water or an aqueous salt solution, e.g., sodium bicarbonate or sodium chloride, and dried. The novel compound, 2-methyl-5-bromopentyl tetrahydropyranyl ether, is obtained upon removal of the solvent.

In the fifth step of this reaction, the 2-methyl-5-bromopentyl tetrahydropyranyl ether is reacted preferably in an inert atmosphere, e.g., nitrogen or argon, with a mixture containing 3-methylnorcamphor, a strong base, and a solvent to obtain the novel compound, tetrahydropyranyl ether of 3-endo-methyl-3-oxo(4'-methyl-5'-hydroxypentyl) norcamphor having the general formula

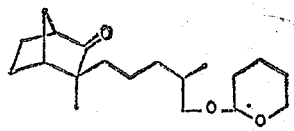

A process for preparing 3-methylnorcamphor is described in Corey et al., The Synthesis of d,l-β-Santalene and d,l-Epi-β-Santalene by Stereospecific Routes, J. Am. Chem.

Soc., 84, p. 2611 (1962). The endo or the exo isomers of 3-methylnorcamphor or mixtures of these isomers can be used herein.

Suitable strong bases and suitable solvents for use therewith are described in House, "Modern Synthetic Reactions," p. 185, Benjamin, New York (1965). In this fifth step, the base-solvent system should possess a relative basicity of $pK_a$ equal to or greater than the $pK_a$ of hydroxyl ion in aprotic solvents. It is preferred that the $pK_a$ of the base solvent system be greater than the $pK_a$ of hydroxyl ion in aprotic solvents. The strong bases include potassium-t-butoxide, sodium-t-amylate, sodium amide, potassium amide, sodium hydride, lithium hydride, dimethyl sulfoxide anion, sodium or potassium or lithium triphenyl methide and sodium napthalenide. Solvents commonly used with these strong bases include benzene, toluene, xylene, tetrahydrofuran, and diethyl ether. Strong bases preferred for use herein are sodium amide and sodium hydride; preferred solvents are benzene, toluene, xylene and tetrahydrofuran.

The mixture of 3-methylnorcamphor, strong base and solvent should contain 3-methylnorcamphor and strong base in a molar ratio of about 1:1. An excess of either component can be used; however, that excess does not aid the reaction and adds to the total cost. Therefore, excess amounts of these two components are generally not used. The amount of solvent used is not critical. Generally, the solvent comprises from about 75% to about 95% by weight of the mixture.

This mixture of 3-methylnorcamphor, strong base and solvent is then heated to form the enolate of 3-methylnorcamphor which has the following general formula (sodium is utilized as a representative cation).

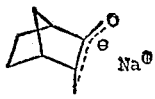

Formation of the enolate generally requires heating for from about one to about eight hours at temperatures ranging from about 50° C. to about 130° C., during which time hydrogen gas is evolved from the reaction mixture. When the theoretical amount of hydrogen gas is evolved, the formation of the enolate is complete. The time required for forming the enolate is, of course, dependent upon concentration of the components, amount of solvent utilized and the intensity of the heat source.

This mixture containing the enolate of 3-methylnorcamphor and the solvent is then reacted with the 2-methyl-5-bromopentyl tetrahydropyranyl ether of Step 4 in a molar ratio of the enolate of 3-methylnorcamphor, (i.e., 3-methylnorcamphor originally in the mixture) to 2-methyl-5-bromopentyl tetrahydropyranyl ether of about 1:1. Excess amounts of either component can be used in this reaction, however, the excess amount is wasted and must be removed from the product or tolerated as an impurity.

This reaction mixture containing the enolate and the tetrahydropyranyl ether compound is maintained at temperatures ranging from 40° C. to about 140° C., usually at the reflux temperature of the solvent being utilized, for from about 24 to about 120 hours to obtain tetrahydropyranyl ether of 3-endo-methyl-3-exo(4'-methyl-5'-hydroxypentyl)norcamphor. A shorter reflux period can be utilized in this step, however, yields will suffer. Longer reflux periods can be used but no advantages are obtained. The reaction product, tetrahydropyranyl ether of 3-endo-methyl - 3 - exo(4' - methyl - 5' - hydroxypentyl)norcamphor, is isolated with, for example, ether, washed with brine and dried. The tetrahydropyranyl ether of 3-endo-methyl - 3 - exo(4'-methyl-5'-hydroxypentyl)norcamphor can then be obtained by removing the ether, e.g., by distillation, and can be purified by subsequent distillation at reduced pressures.

In the sixth step of this process, tetrahydropyranyl ether of 3 - endo - methyl - 3 - exo(4'-methyl-5'-hydroxypentyl)norcamphor is treated with a catalytic amount of p-toluenesulfonic acid or hydrochloride acid, i.e., from about 5% to about 10% by weight of tetrahydropyranyl ether of endo-methyl - 3 - exo(4'-methyl-5'-hydroxypentyl)norcamphor, to obtain 3-endo-methyl-3-exo(4'-methyl-5'-hydroxypentyl)norcamphor having the general formula

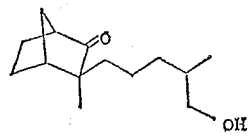

In this step of this reaction a short chain alcohol having from 1 to 3 carbon atoms is generally utilized as a solvent in a ratio of solvent to tetrahydropyranyl ether of 3-endo-methyl-3-exo(4'-methyl-5'-hydroxypentyl)norcamphor of from about 10:1 to about 20:1 by weight. The reaction mixture is maintained at temperatures ranging from 40° C. to about 100° C. Generally, the reaction is run at solvent reflux temperature, e.g., 78° C. for ethanol, for about one hour to about five hours to obtain 3-endo-methyl-3-exo(4' - methyl - 5'-hydroxypentyl)norcamphor.

The novel product, 3-endo-methyl-3-exo(4'-methyl-5'-hydroxypentyl)norcamphor, can be easily separated from the reaction mixture. Most of the alcohol is first removed from the reaction mixture, e.g., by distillation, and then the remaining reaction product is added to water or an aqueous brine solution. The product, 3-endo-methyl-3-exo(4'-methyl-5'-hydroxypentyl)norcamphor, is isolated with ether, dried and any remaining alcohol is removed with the ether by distillation at reduced pressure, 3-endo-methyl-3-exo(4'-methyl-5'-hydroxypentyl)norcamphor has valuable perfume properties and also has utility as an intermediate in the synthesis of dihydro-β-santalol, a very valuable sandalwood substitute. 3-endo-methyl-3-exo(4'-methyl - 5' - hydroxypentyl)norcamphor and its use as a perfume and as an intermediate in the systhesis of dihydro-β-santalol is more specifically discussed in the copending U.S. patent application of Fanta and Erman, 3-Endo-Methyl - 3 - Exo(4' - Methyl - 5' - Hydroxypentyl)Norcamphor and 2-Methyl-5-Bromopentanol, and Process for the Preparation of These Compounds, Ser. No. 717,360; filed Mar. 29, 1968.

The novel compounds, 2-methyl-5-bromopentyl tetrahydropyranyl ether and tetrahydropyranyl ether of 3-endo-methyl - 3 - exo(4' - methyl-5'-hydroxypentyl)norcamphor, prepared by the process of this invention both have highly desirable and useful odors. The odor of 2-methyl-5-bromopentyl tetrahydropyranyl ether is characterized as a mild, sweet, woody odor while the odor of tetrahydropyranyl ether of 3-endo-methyl-3-exo(4'-methyl-5'-hydroxypentyl)norcamphor is charactererized as a mild, herbaceous, woody odor. These compounds can be used individually or in admixture with each other as odorants per se or these compounds can be used as components of perfume compositions for ultimate use in products such as soaps, detergents, deodorants and the like. Perfume compositions containing odoriferously effective amounts, e.g. 0.0001% to about 50% but preferably from 0.01% to about 20%, of either of the above described compounds are desirable useful. More specific illustrations of these compounds are found in Examples II to V, hereinafter.

EXAMPLES

The following examples illustrate specific preferred embodiments of this invention and are not intended to be limiting. All percentages and ratios in the following examples as well as in the specification and in the appended claim are by weight unless otherwise indicated. Temperatures are expressed in degrees centigrade.

Data listed in all of the examples were obtained by means of the following techniques unless otherwise indicated. The apparatus described by Johnson etal., "β-Carbethoxy-γ,γ-Diphenylvinylacetic Acid," Organic Syntheses, 30, p. 18 (1950), was used to maintain a nitrogen atmosphere. Infrared spectra were determined on a Perkin-Elmer Model 137 spectrophotometer; ultraviolet spectra were determined in ethanol on a Perkin-Elmer Model 202 spectrophotometer. Nuclear magnetic resonance (N.M.R.) spectra were determined in carbon tetrachloride with a Varian Model HA-100 spectrometer with chemical shifts measured relative to tetramethylsilane (10τ). The N.M.R. data are noted by chemical shift, integration, multiplicity, coupling constant (in Hz.), and assignment. Gas-liquid chromatography was accomplished with an Aerograph Model 202B using a flow rate of 100 ml./min. on 5-ft. by 0.25-in. columns packed with (A) 20% FFAP (Carbowax 20M terminal with nitroterephthalic acid) on 60/80 mesh Chromosorb P or (B) 20% SE 30 (a methyl silicone gum rubber compound) on 60/80 mesh Chromosorb W.

EXAMPLE I

Preparation of 3-endo-methyl-3-exo(4'-methyl-5'-hydroxypentyl)norcamphor from allyl alcohol (A) Preparation of 2-methyl-4-pentenol from allyl alcohol.—An apparatus consisting of a 1-liter flask fitted with an addition funnel, mechanical stirrer and reflux condenser was flame dried under vacuum and a nitrogen atmosphere introduced. A solution of 23.2 g. (0.4 mole) of allyl alcohol in 60 ml. of anhydrous diethyl ether was introduced into the apparatus; 150 ml. of 3 M methyl magnesium bromide (0.45 mole) in diethyl ether was added at a rate which maintained gentle reflux (ca. 4 hours). The solid formed during the early stages of addition gradually dissolved to afford a clear brown solution. This solution was treated with 360 ml. of 1.4 M ethereal allyl magnesium bromide (0.5 mole) and the resulting reaction mixture was stirred rapidly at reflux for 50 hours. The resulting mixture was added slowly to ice and solution was effected by cautious addition of 10% aqueous hydrochloric acid. The solution was saturated with salt and the product, 2-methyl-4-pentenol, was isolated with ether. Combined extracts were washed with brine and dried over magnesium sulfate. Removal of the solvent and subsequent distillation afforded 25.4 g. (64%) of 2-methyl-4-pentenol, B.P. 53–58° (13 mm.) which showed 96% purity by gas-liquid partition chromatography. Material purified by redistillation, B.P. 57–59° (13 mm.) and gas chromatography exhibited $n_D^{21.5}$ 1.4319, $$\lambda_{max}^{film} \ 3.00, 3.28, 6.10, 9.68, 10.04, 10.91\mu,$$

N.M.R. signals at τ 4.00–4.51 (1H, —CH=), 4.90–5.20 (2H, CH=CH$_2$), 5.60 (1H, OH), 6.40–6.80 (2H, CH$_2$OH), 9.10 (3H, doublet, J=7 Hz., CHCH$_3$). Reported for 2-methyl-4-pentenol $n_D^{18}$ 1.4345.

Analysis.—Calculated for C$_6$H$_{12}$O (percent): C, 71.95; H, 12.08. Found (percent): C, 72.12; H, 12.18.

(B) Preparation of 2-methyl-4-pentenyl acetate from 2-methyl-4-pentenol (Step 1).—A dry 100 ml. flask was charged with a solution of 3.44 g. (0.0344 mole) of 2-methyl-4-pentenol in 35 ml. of anhydrous pyridine. A nitrogen atmosphere was introduced and 10.78 g. (0.105 mole) (10 ml.) of acetic anhydride was added under a positive nitrogen pressure. After stirring for 24 hours at room temperature, the reaction mixture was added to brine and the reaction product was isolated with diethyl ether. The pyridine was removed from the ether extracts with several 3% aqueous hydrochloric acid washes. The ether extracts were then washed with brine and dried over magnesium sulfate. The ether was removed to afford a crude oil which on distillation gave 4.30 g. (88%) of colorless 2-methyl-4-pentenyl acetate, B.P. 60–65° (15 mm.) which showed 99% purity by gas-liquid partition chromatography. Material purified by further distillation had the following characteristics: B.P. 54–56° (15 mm.), exhibited $n_D^{26}$ 1.4140, $$\lambda_{max}^{film} \ 3.28, 5.71, 6.10, 8.06, 9.62, 10.05, 10.91\mu$$

N.M.R. signals at τ 4.10–4.55 (1H, —CH=), 4.90–5.19 (2H, CH=CH$_2$), 6.05–6.36 (2H, CH$_2$OAc), 8.08 (6H, —CHCH$_2$—, OAc), 9.11 (3H, doublet, J=6 Hz. CHCH$_3$).

Analysis.—Calculated for C$_8$H$_{14}$O$_2$ (percent): C, 67.57; H, 9.93. Found (percent): C, 67.30; H, 9.96.

Results substantially similar to those achieved in paragraph B are obtained when the following solvents are substituted for pyridine on an equal weight basis: collidine, trimethylamine and triethylamine. Substantially similar results are also obtained when the following compounds are substituted for acetic anhydride in esterifying 2-methyl-4-pentenol: acetyl bromide, acetyl chloride, propionyl bromide, propionyl chloride, valeryl bromide, butyryl chloride, propionic anhydride, acetic propionic anhydride, butanoic anhydride, and acetic butanoic anhydride. 2-methyl-4-pentenol can also be esterified by utilizing acetic acid, propionic acid, and butanoic acid plus a trace of any Lewis acid.

(C) Preparation of 2-methyl-5-bromopentyl acetate from 2-methyl-4-pentenyl acetate (Step 2).—A dry, 250 ml. flask fitted with a subsurface gas inlet and reflux condenser was charged with a solution of 12.84 g. (0.09 mole) of 2-methyl-4-pentenyl acetate in 100 ml. of hexane and 222 mg. (0.9 mm.) of benzoyl peroxide. The mixture was cooled to 0° and anhydrous hydrogen bromide gas in molar excess, ca. 0.9 mole, was passed into the flask rapidly over a 15 minute period. The reaction mixture was stirred for an additional 15 minutes. The excess gas was removed by a nitrogen sweep, and the total solution was washed with a saturated aqueous solution of sodium bicarbonate and then brine until the pH of the reaction mixture was about 7. The reaction mixture was dried with magnesium sulfate and the dried hexane was removed by distillation. The reaction product remaining was crude 2-methyl-5-bromopentyl acetate which on distillation gave 17.37 g. (85%) of product, B.P. 69–72° (0.85 mm.). Further purification by distillation, B.P. 69–71° (0.9 mm.), and gas liquid chromatography gave an oil exhibiting $n_D^{33}$ 1.4533, $$\lambda_{max}^{film} \ 5.73, 8.10, 9.63\mu$$

N.M.R. signals at τ 6.14 (2H, doublet, J=6.5 Hz., CH$_2$OAc), 6.63 (2H, triplet, J=7 Hz., CH$_2$Br), 8.03 (3H, OAc), 9.06 (3H, doublet, J=6.5 Hz., CHCH$_3$). Reported for 2-methyl-5-bromopentyl acetate $n_D^{33}$ 1.4539, B.P. 77° (3 mm.).

Analysis.—Calculated for C$_8$H$_{15}$BrO$_2$ (percent): C, 43.06; H, 6.78; Br, 35.82. Found (percent): C, 43.04; H, 6.75; Br, 35.78.

Results substantially similar to those achieved in paragraph C are obtained when the following solvents are substituted for hexane on an equal weight basis: pentane, cyclohexane, methylene chloride, diethyl ether, carbon tetrachloride, benzene, toluene, and xylene. Substantially similar results are also obtained when the following free radical catalysts, in a catalytic amount, are substituted for benzoyl peroxide: ozone, oxygen, t-butyl peroxide, acetyl peroxide, ascaridole, azotriphenylmethane, bromoacetone, and compounds such as acetone and tetraethyl lead in the presence of ultraviolet light.

(D) Preparation of 2-methyl-5-bromopentanol from 2-methyl-5-bromopentyl acetate (Step 3).—A dry 250 ml. flask fitted with septum, reflux condenser and drying tube was charged with 950 mg. (0.025 mole) of lithium aluminum hydride and 25 ml. of anhydrous diethyl ether. An aluminum chloride-ether complex prepared by cautiously adding 38 ml. of anhydrous diethyl ether to 3.33 g. (0.025 mole) of aluminum chloride was added to the flask followed by a solution of 5.53 g. (0.025 mole) of 2-methyl-5-bromopentyl acetate in 50 ml. of anhydrous diethyl ether. The 2-methyl-5-bromopentyl acetate solution was added over a 15 minute period at a rate sufficient to maintain the reaction mixture at gentle reflux. The reaction mixture was stirred at room temperature for one hour at which time 9 ml. of water was cautiously added to the reaction mixture followed by 35 ml. of 6 N aqueous sulfuric acid in 25 ml. of water. The resulting mixture was extracted with ether and the combined ether extracts were washed once with brine. The ether extracts were dried with magnesium sulfate and the dried solvent was removed. A crude yellow oil remained which on distillation gave 4.18 g. (94%) of clear 2-methyl-5-bromopentanol, B.P. 65–65.5° (0.04 mm.) which showed 97% purity by gas-liquid partition chromatography. Redistillation B.P. 62° (0.02 mm.), gave material exhibiting $n_D{}^{25}$ 1.4829, $n_D{}^{25}$ 1.4829, $\lambda_{max}^{film}$ 2.99, 9.68$\mu$ N.M.R. signals at $\tau$ 4.30 (1H, OH) 6.59 (2H, doublet, J=7 Hz., CH$_2$OH), 6.61 (2H, triplet, J=7 Hz., CH$_2$OH), 6.61 (2H, triplet, J=6.5 Hz., CH$_2$Br), 9.05, 3H, doublet, J=6 Hz., CHCH$_3$).

Analysis.—Calculated for C$_6$H$_{13}$BrO (percent): C, 39.79; H, 7.23; Br, 44.14. Found (percent): C, 39.90; H, 7.23; Br, 44.07.

Results substantially similar to those achieved in paragraph D are obtained when the following solvents are substituted for diethyl ether on an equal weight basis: tetrahydrofuran, 1,2-dimethoxyethane, and bis-(2-methoxy ethyl)ether. Substantially similar results are also obtained when the following reducing agents are substituted for the lithium aluminum hydride-aluminum chloride reducing mixture on an equimolar basis: lithium aluminum hydride, lithium borohydride, and diborane.

(E) Preparation of 2-methyl-5-bromopentyl tetrahydropyranyl ether from 2 methyl-5-bromopentanol (Step 4).—A dry 50 ml. flask was charged with a mixture of 10.5 g. (0.059 mole) of 2-methyl-5-bromopentanol and 6.2 g. (0.074 mole) of dihydropyran (distilled). The flask was fitted with a drying tube, cooled to 0° C., and the solution was treated with 25 drops of phosphorous oxychloride. The resulting reaction mixture was stirred at room temperature for three hours and then added to 100 ml. of 2% aqueous sodium hydroxide. The reaction product was isolated with diethyl ether. The ether isolate was washed with brine, dried over magnesium sulfate and the solvent removed to give 15.44 grams of crude 2-methyl-5-bromopentyl tetrahydropyranyl ether. Distillation afforded 14.95 g. (96%) of colorless 2-methyl-5-bromopentyl tetrahydropyranyl ether, B.P. 83–85° (0.02 mm.). Redistillation gave 2-methyl-5-bromopentyl tetrahydropyranyl ether exhibiting $n_D{}^{25}$ 1.4729

$\lambda_{max}^{film}$ 8.34, 8.91, 9.29, 9.41, 9.67, 10.21, 11.02, 11.46, 12.20$\mu$ N.M.R. signals at $\tau$ 5.55 (1H, —CH—O), 6.10–7.05 (4H, CH$_2$—O—CH—O—CH$_2$), 6.68 (2H, triplet, J=7 Hz., CH$_2$Br), 9.08 (3H, doublet, J=6 Hz., CHCH$_3$).

Analysis.—Calculated for C$_{11}$H$_{21}$BrO$_2$ (percent): C, 49.82; H, 7.98; Br, 30.14. Found (percent): C, 49.92; H, 8.08; Br, 30.06.

Results substantially similar to those achieved in paragraph E are obtained when hydrochloric acid or p-toluene-sulfonic acid in catalytic amounts are substituted for phosphorous oxychloride.

The 2-methyl-5-bromopentyl tetrahydropyranyl ether isolated in paragraph E above had an odor characterized as a mild sweet woody odor. This odor characteristic is useful in a wide variety of perfume compositions.

(F) Preparation of tetrahydropyranyl ether of 3-endo-methyl - 3 - exo(4'-methyl-5'-hydroxypentyl)norcamphor from 2-methyl-5-bromopentyl tetrahydropyranyl ether (Step 5).—A 500 ml. flask fitted with a condenser and addition funnel was charged with 4.9 g. (0.125 mole) of a 61% mineral oil dispersion of sodium hydride. A nitrogen atmosphere was introduced followed by 60 ml. of benzene (distilled). A solution of 12.4 g. (0.1 mole) of 3-methylnorcamphor in 60 ml. of redistilled benzene was added and enolate formation took place over two hours at reflux (80°–100°). To this refluxing reaction mixture was added a solution of 26.5 g. (0.1 mole) of 2-methyl-5-bromopentyl tetrahydropyranyl ether in 60 ml. of redistilled benzene. Reflux continued for an additional 61 hours after which time the cooled reaction mixture was added to brine and the reaction product isolated with diethyl ether. The combined ether extracts were washed with brine and dried over magnesium sulfate. Removal of solvent afforded 33.52 g. of a yellow oil. The crude oil contained several grams of unreacted starting materials which were smoothly removed by distillation, B.P. 30–100° (0.02 mm.). The residual oil, 20.78 g. (67%) was composed primarily of tetrahydropyranyl ether of 3 - endo-methyl-3-exo(4'-methyl-5'-hydroxypentyl)norcamphor and was treated as described in the following step. The residual oil can be distilled to afford pure tetrahydropyranyl ether of 3-endo-methyl-3-exo(4'-methyl - 5' - hydroxypentyl)norcamphor, 135–140° (0.02 mm.), and exhibits $\lambda_{max}^{film}$ 5.72, 8.31, 8.90, 9.28, 9.39, 9.67, 10.19, 11.00, 11.48 12.19$\mu$ N.M.R. signals at $\tau$ 5.53 (1H, OCHO), 7.58, 7.68 (2H, C$_1$—H, C$_4$—H), 9.02 (3H, CH$_3$), 9.06 (3H, doublet, J=6 Hz., CHCH$_3$).

Analysis.—Calculated for C$_{19}$H$_{32}$O$_3$ (percent): C, 73.98; H, 10.46. Found (percent): C, 73.87; H, 10.53.

Results substantially similar to those obtained in paragraph F are achieved when the following strong bases are substituted for sodium hydride on an equimolar basis: potassium - t - butoxide, sodium-t-amylate, sodium amide, potassium amide, lithium hydride, dimethyl sulfoxide anion, sodium triphenyl methide and sodium napthalenide. Substantially similar results are also obtained when the following solvents are substituted for benzene: toluene, xylene, and tetrahydrofuran.

The tetrahydropyranyl ether of 3-endo-methyl-3-exo(4'-methyl - 5' - hydroxypentyl)norcamphor isolated in paragraph F above had an odor characterized as a mild herbaceous woody odor. This odor characteristic is useful in a wide variety of perfume compositions.

(G) Preparation of 3-endo-methyl-3-exo(4'-methyl-5'-hydroxypentyl)norcamphor from tetrahydropyranyl ether of 3-endo-methyl - 3 - exo(4'-methyl - 5' - hydroxypentyl) norcamphor (Step 6).—A solution of 20.78 g. (0.067 mole) of crude tetrahydropyranyl ether of 3-endo-methyl-3-exo (4'-methyl-5'-hydroxyphenyl)norcamphor and 1.5 g. (0.008 mole) of p-toluenesulfonic acid monohydrate in 250 ml. of ethanol was refluxed under nitrogen for 2 hours. The cooled reaction was added to brine and the product was isolated with ether. Removal of the magnesium sulfate dried solvent afforded 19.12 g. of crude 3-endo-methyl-3-exo(4'-methyl - 5' - hydroxypentyl)norcamphor which on subsequent distillation gave 14.0 g. (96%) of product. Further purification by distillation, B.P. 127–130° (0.07 mm.) and gas-liquid partition chromatography gave 3-endo-methyl - 3 - exo(4'-methyl-5'-hydroxypentyl)norcamphor exhibiting $\lambda_{max}^{film}$ 2.90, 5.73, 7.30, 9.60, 10.92, 13.02$\mu$ N.M.R. signals at $\tau$ 6.68 (2H, doublet, J=6 Hz., CH$_2$OH), 7.01 (1H, OH), 7.51, 7.65 (2H, C$_1$—H, C$_4$—H), 9.01 (3H, CH$_3$), 9.08 (3H, doublet, J=6.5 Hz., CHCH$_3$).

Analysis.—Calculated for C$_{14}$H$_{24}$O$_2$ (percent): C, 74.95; H, 10.78. Found (percent): C, 74.81; H, 10.83.

Results substantially similar to those obtained in paragraph G are achieved when methanol, propanol and isopropanol are substituted for ethanol on an equal weight basis. Substantially similar results are also obtained when hydrochloric acid is substituted for p-toluenesulfonic acid monohydrate.

3-endo-methyl-3-exo(4' - methyl - 5' - hydroxypentyl) norcamphor isolated in paragraph G above had an odor characterized as sweet, fruity (strawberry, pineapple, melon, berry, apple), floral note. Uses for this compound as a perfume component and as an intermediate in the synthesis of dihydro-β-santalol are more specifically set forth in Fanta and Erman, 3-Endo-Methyl-3-Exo(4'-Methyl-5'-Hydroxypentyl)Norcamphor and 2-Methyl-5-Bromopentanol, and Process for the Preparation of These Compounds, Ser. No. 717,360, filed Mar. 29, 1968.

EXAMPLE II

Perfume compositions containing 2-methyl-5-bromopentyl tetrahydropyranyl ether

Perfume compositions containing 2-methyl-5-bromopentyl tetrahydropyranyl ether are prepared by intermixing the components shown below. The compositions exhibit highly desirable and useful odors.

COMPOSITION H—MIMOSA

| Components: | Parts by weight |
|---|---|
| Mimosa absolute | 10.00 |
| Artificial mimosa | 12.50 |
| Bulgarian rose | 2.50 |
| Ylang ylang | 7.00 |
| Bergamot | 6.00 |
| Heliotropin | 9.00 |
| Coumarin | 4.00 |
| Isobutyl salicylate | 9.50 |
| 2-methyl-5-bromopentyl tetrahydropyranyl ether | 4.00 |
| Synthetic civet | .50 |
| Musk ketone | 5.00 |

COMPOSITION I—MIMOSA SUPER

| Components: | Parts by weight |
|---|---|
| Artificial mimosa | 41.00 |
| Natural mimosa | 10.00 |
| Bulgarian rose | 2.50 |
| Ylang ylang | 7.00 |
| Bergamot | 6.00 |
| 2-methyl-5-bromopentyl tetrahydropyranyl ether | 6.00 |
| Heliotropin | 9.00 |
| Isobutyl salicylate | 9.50 |
| Synthetic civet | .50 |
| Coumarin | 4.00 |
| Musk ketone | 5.00 |
| $C_9$–$C_{10}$ aldehyde | 1.00 |
| $C_{10}$–$C_{12}$ aldehyde | .50 |

The components and proportions in the perfume compositions of this example can be adjusted according to methods well known in the perfume art to form a wide variety of desirable perfume compositions containing odoriferously effective amounts of these compounds.

EXAMPLE III

Perfume compositions containing tetrahydropyranyl ether of 3-endo-methyl-3-exo(4'-methyl-5'-hydroxypentyl)norcamphor

COMPOSITION J—RUSSIAN LEATHER

| Components: | Parts by weight |
|---|---|
| Birch tar oil, rectified | 10.00 |
| Tincture of castoreum, 5% | 10.00 |
| Rose oil bulgarian | 2.50 |
| Styrax resinoid | 10.00 |
| Bergamot oil | 10.00 |
| Tetrahydropyranyl ether of 3-endo-methyl-3-exo(4'-methyl-5'-hydroxypentyl)norcamphor | 2.50 |
| Patchoili oil | .50 |
| Jasmine absolute | 2.00 |
| Musk ambrette | 2.50 |
| Musk ketone | 2.50 |
| Neroli oil bigarade | 5.00 |
| Vetivert oil | 2.50 |
| Coumarin | 6.00 |
| Tonka resinoid | 1.50 |
| Amber synthetic | 7.50 |
| Rhodinol | 10.00 |
| Ylang ylang | 5.00 |
| Petitgrain | 10.00 |

COMPOSITION K—JASMINE

| Components: | Parts by weight |
|---|---|
| Benzyl acetate | 36.00 |
| Linalyl acetate | 6.00 |
| Phenyl ethyl alcohol | 6.00 |
| Amyl cinnamic alcohol | 9.00 |
| Hydroxycitronellal | 10.00 |
| Benzyl alcohol | 8.00 |
| Methyl anthranilate | 3.00 |
| Linalool | 4.50 |
| Para cresyl phenyl acetate | 1.50 |
| Cananga | 5.00 |
| Tetrahydropyranyl ether of 3-endo-methyl-3-exo(4'-methyl-5'-hydroxypentyl)norcamphor | 3.00 |
| Dimethyl benzyl carbinol | 1.50 |
| Styrax | 5.00 |
| Benzyl formate | 1.50 |

The components and proportions in the perfume compositions of this example can be adjusted according to methods well known in the perfume art to form a wide variety of desirable perfume compositions containing odoriferously effective amounts of these compounds.

EXAMPLE IV

Detergent compositions

A conventional, granular, heavy-duty built detergent having the following composition is prepared:

| Component: | Percent by weight |
|---|---|
| Sodium dodecyl benzene sulfonate | 20.0 |
| Sodium tripolyphosphate | 50.0 |
| Sodium silicate ($SiO_2$:$Na_2O$ ratio of 2:1) | 6.0 |
| Sodium sulfate | 14.0 |
| Water | 9.8 |
| Perfume composition H of Example II | 0.2 |
| Total | 100.0 |

The detergent composition exhibits a highly desirable mimosa fragrance. Composition I of Example II, Composition J or Composition K of Example III can be substituted for Composition H in the above heavy-duty built detergent. Composition I imparts a super mimosa fragrance to the detergent; Composition J imparts a Russian leather fragrance; and Composition K imparts a jasmine fragrance.

EXAMPLE V

Soap bar composition

A conventional household soap bar having the following composition is prepared:

| Component: | Parts by weight |
|---|---|
| Sodium soap | 75.0 |
| Potassium soap | 7.5 |
| (The toal soap comprises a mixture of 80% tallow soap and 20% coconut soap.) | |
| Water | 15.0 |
| Perfume Composition H of Example II | 2.5 |

This soap bar exhibits a highly desirable mimosa fragrance. Composition I of Example II, Composition J or Composition K of Example III can be substituted for Composition H in the above soap bar composition. Composition I imparts a super mimosa fragrance to the detergent; Composition J imparts a Russian leather fragrance; and Composition K imparts a jasmine fragrance.

What is claimed is:

1. A perfume composition comprising a mixture of perfumes including an odoriferously effective amount of tetrahydropyranyl ether of 3-endo-methyl-3-exo(4'-methyl-5'-hydroxypentyl)norcamphor having the formula:

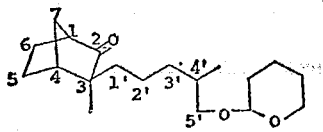

References Cited

UNITED STATES PATENTS

| | | | |
|---|---|---|---|
| 3,470,209 | 9/1969 | Lamparsky | 252—522 X |
| 3,161,657 | 12/1964 | Eschenmoser | 252—522 X |

OTHER REFERENCES

Ber. der deut. Chem. Gesell. vol. 95, 162, pp. 2939–2944.

ALBERT T. MEYERS, Primary Examiner

A. P. FAGELSON, Assistant Examiner

U.S. Cl. X.R.

252—132, 138; 260—349.5

UNITED STATES PATENT OFFICE
CERTIFICATE OF CORRECTION

PO-1050
(5/69)

Patent No. 3,644,505      Dated February 22, 1972

Inventor(s) Wayne I. Fanta and William F. Erman

It is certified that error appears in the above-identified patent and that said Letters Patent are hereby corrected as shown below:

Column 7, line 10, after "base" and before "solvent" insert --- - ----.

Column 8, line 33, delete "," and insert therefor --- . ---.

Column 11, line 2, delete "rection" and insert --- reaction ---.

Column 11, line 16, delete "$n_D^{25}$ 1.4829,"

Column 14, line 51,      "." , second occurrence, should read -- , --.

Signed and sealed this 18th day of July 1972.

(SEAL)
Attest:

EDWARD M. FLETCHER, JR.
Attesting Officer

ROBERT GOTTSCHALK
Commissioner of Patents